United States Patent
Kim (10) Patent No.: US 9,392,925 B2
(45) Date of Patent: Jul. 19, 2016

(54) MOTOR DRIVE DEVICE FOR WASHING MACHINE AND MOTOR CONTROL METHOD THEREOF

(71) Applicant: AMOTECH CO., LTD., Incheon (KR)

(72) Inventor: Byoung Soo Kim, Anyang-si (KR)

(73) Assignee: AMOTECH CO., LTD. (KR)

( * ) Notice: Subject to any disclaimer, the term of this patent is extended or adjusted under 35 U.S.C. 154(b) by 793 days.

(21) Appl. No.: 13/726,784

(22) Filed: Dec. 26, 2012

(65) Prior Publication Data

US 2013/0160499 A1 Jun. 27, 2013

(30) Foreign Application Priority Data

Dec. 26, 2011 (KR) .......................... 10-2011-0142046

(51) Int. Cl.
*D06F 37/40* (2006.01)
*A47L 15/00* (2006.01)
*D06F 37/30* (2006.01)

(52) U.S. Cl.
CPC ............ *A47L 15/0018* (2013.01); *D06F 37/304* (2013.01); *D06F 37/40* (2013.01); *Y02B 40/52* (2013.01)

(58) Field of Classification Search
CPC ..... D06F 37/30; D06F 37/304; D06F 37/306; D06F 37/32; D06F 37/34; D06F 37/36; D06F 37/38; D06F 37/40
See application file for complete search history.

(56) References Cited

U.S. PATENT DOCUMENTS

| 3,194,032 A | * | 7/1965 | Von Brimer | .......... D06F 37/304 310/13 |
| 6,257,027 B1 | * | 7/2001 | Imai | ...................... D06F 37/304 68/12.12 |

FOREIGN PATENT DOCUMENTS

KR 1020030062556 7/2003

* cited by examiner

*Primary Examiner* — David Cormier
(74) *Attorney, Agent, or Firm* — Cantor Colburn LLP (57) ABSTRACT

Provided is a motor drive device for a motor for a washing machine of a double-rotor/double-stator structure that can selectively rotate a pulsator and a dehydrator without having a separate clutch, and a motor control method thereof. The motor drive device includes: a motor controller that generates a drive signal according to a laundry control signal to thus control a motor for the washing machine to be driven: an inverter that generates three-phase alternating-current (AC) power under the control of the motor controller, and outputs the three-phase AC power to a first three-phase stator coil for rotating an outer rotor in the motor for the washing machine, and a second three-phase stator coil for rotating an inner rotor therein; and a rotor drive controller that is provided between the inverter and the second three-phase stator coil, to thus block or pass the three-phase AC power under the control of the motor controller and simultaneously change the direction of rotation of the inner rotor.

12 Claims, 11 Drawing Sheets

Fig. 11

MOTOR DRIVE DEVICE FOR WASHING MACHINE AND MOTOR CONTROL METHOD THEREOF

CROSS-REFERENCE TO RELATED APPLICATION

This application claims the benefit of Korean Patent Application No. 10-2011-0142046, filed on Dec. 26, 2011, in the Korean Intellectual Property Office, the disclosure of which is incorporated herein by reference.

BACKGROUND OF THE INVENTION

1. Field of the Invention

The present invention relates to a motor drive device for a motor for a washing machine of a double-rotor/double-stator structure that can selectively rotate a pulsator and a dehydrator without having a separate clutch, and a motor control method thereof.

2. Description of the Related Art

In general, a direct-drive washing machine selectively rotates a pulsator and a dehydrator by using a single motor for the washing machine.

For example, a motor for a washing machine repeatedly rotates a pulsator in a forward and reverse direction when the washing machine performs a laundry operation and a rinsing operation of washes, and rotates the pulsator and a dehydrator in an identical direction at high-speed when the washing, machine performs a dehydration operation of the washes.

In order to rotate only the pulsator or both the pulsator and the dehydrator, by using the single motor for the washing machine, conventional direct-drive washing machines include a clutch, respectively (see Korean Patent Registration No. 10-0438616 on Jun. 23, 2004).

The clutch plays a role of rotating the pulsator when the rotating torque of the motor for the washing machine is delivered to the rotating shaft of the pulsator, or rotating both the pulsator and the dehydrator at high-speed when the rotating torque of the motor for the washing machine is delivered to the rotating shaft of the pulsator and the rotating shaft of the dehydrator.

However, the clutch includes a coupling unit, a coupling lifting lever, a lifting lever drive unit, and so on and includes a torque transmission unit having a sun gear, as planetary gear, a carder, and so on, in order to deliver the rotating torque of a rotor to the pulsator during performing a laundry operation. As a result, the configuration of the clutch becomes very complicated and the price thereof is expensive, to thereby cause manufacturing costs for the washing machine to rise up.

SUMMARY OF THE INVENTION

To solve the above conventional problems or defects, it is an object of the present invention to provide a motor drive device for a motor for a washing machine, and a motor control method thereof, in which a pulsator and a dehydrator are made to selectively rotate by means of a motor for a washing machine having a double-rotor/double-stator structure without using a separate clutch, during washing laundry.

It is another object of the present invention to provide a motor drive device for a motor for a washing machine, and a motor control method thereof, in which a dehydrator stops when a laundry or rinsing operation of laundry is performed by rotating, a pulsator.

It is still another object of the present invention to provide a motor drive device for a motor for a washing machine, and a motor control method thereof, in which a rotational direction of a dehydrator is determined in a direction equal or reverse to that of a pulsator, when a laundry or rinsing operation of laundry is performed by rotating the pulsator, and the dehydrator is made to rotate in the determined rotational direction, to thereby enhance washing efficiency of laundry.

It is yet another object of the present invention to provide a motor drive device for a motor for a washing machine, and a motor control method thereof, in which a dehydrator stops or is made to rotate in a direction equal or reverse to that of a pulsator, depending on a progress of a laundry operation and a rinsing operation, at a state where the laundry or rinsing operation of laundry is performed by rotating the pulsator, to thereby enhance washing efficiency of laundry.

It is still yet another object of the present invention to provide a motor drive device for a motor for a washing machine, and a motor control method thereof, in which a pulsator and a dehydrator are made to rotate in an identical direction at high-speed when a dehydration operation of laundry is performed, to thereby enhance dehydration efficiency of laundry.

It is a further object of the present invention to provide a motor drive device for a motor for a washing machine and a motor control method thereof, that cat individually control an inner rotor and an outer rotor in a motor having a double-rotor/double-stator structure.

The other objects of the present invention are not limited to the above-mentioned objects, and will be clearly understood by one of ordinary skill in the art from the following description.

In order to achieve the above objects of the present invention, according to an aspect of the present invention, there is provided a motor drive device for a washing machine, the motor drive device comprising:

a motor controller that generates a drive signal according to a laundry control signal to thus control a motor for the washing machine to be driven;

an inverter that generates three-phase alternating-current (AC) power under the control of the motor controller, and outputs the three-phase AC power to a first three-phase stator coil for rotating an outer rotor in the motor for the washing machine, and a second three-phase stator coil for rotating an inner rotor therein; and a first rotor drive controller that blocks or passes the three-phase AC power under the control of the motor controller, to thus control the inner rotor to be driven.

According to another aspect of the present invention, there is provided a motor control method comprising the steps of:

determining an operation mode of laundry on the basis of a laundry control signal in a motor controller;

rotating, an outer rotor of a motor for a washing machine, in the case that the determined operation mode is a wash mode or a rinse mode, to thus rotate a pulsator; and rotating the outer rotor and an inner rotor for the motor for the washing machine in the case that the determined operation mode is a dehydration mode, to thus rotate both the pulsator and a dehydrator.

According to still another aspect of the present invention, there is provided a motor drive device for driving a motor of a double-rotor/double-stator structure, in which the double-rotor/double-stator structure motor comprising: an inner rotor; an outer rotor; an inner stator that drives the inner rotor: and an outer stator that drives the outer rotor, wherein the inner and outer stators are disposed between the inner and outer rotors with an air gap, respectively, the motor drive device comprising:

a motor controller that generates a drive signal according to an external control signal;

an inverter that generates three-phase alternating-current (AC) power under the control of the motor controller, and outputs the three-phase AC power to the inner stator and the outer stator; and a rotor drive controller that blocks or passes the three-phase AC power according to the drive signal from the motor controller, to thus control the inner rotor to be driven, and change the direction of rotation of the inner rotor at a time of driving of the inner rotor.

ADVANTAGEOUS EFFECTS

A motor drive device for a motor for a washing machine, and a motor control method thereof, according to the present invention, drives the motor for the washing machine having a double-stator in order to individually rotate an outer rotor and an inner rotor, to thereby individually rotate a pulsator and a dehydrator by using the single motor for the washing machine.

Therefore, a dehydrator stops or is made to rotate in a direction equal or reverse to that of a pulsator, at a state where a laundry or rinsing operation of laundry is performed by rotating the pulsator, to thereby enhance washing efficiency of laundry.

In addition, a pulsator and a dehydrator are made to rotate in an identical direction when a dehydration operation of laundry is performed, to thereby enhance dehydration efficiency of laundry, and save power consumption.

BRIEF DESCRIPTION OF THE DRAWINGS

Hereinafter, the present invention will be described in detail, by way of embodiments that limit the present invention with reference to the accompanying drawings, and like reference numerals denote like elements in some drawings.

DETAILED DESCRIPTION OF THE INVENTION

The objects, features and advantages of the invention will appear more fully upon consideration of the illustrative embodiments now to be described in detail with the accompanying drawings. Accordingly, the technological concepts of the present invention can be easily understood by one skilled in the art.

In addition, the detailed description of know techniques relating to the present invention will be omitted so as not to obscure the gist of the invention.

The above and/or other objects and/or advantages of the present invention will become more apparent by the following description.

Prior to describing a motor drive device for a washing machine according to the present invention, a motor of a double-rotor/double-stator structure in which the present invention is applied.

Figure 5:
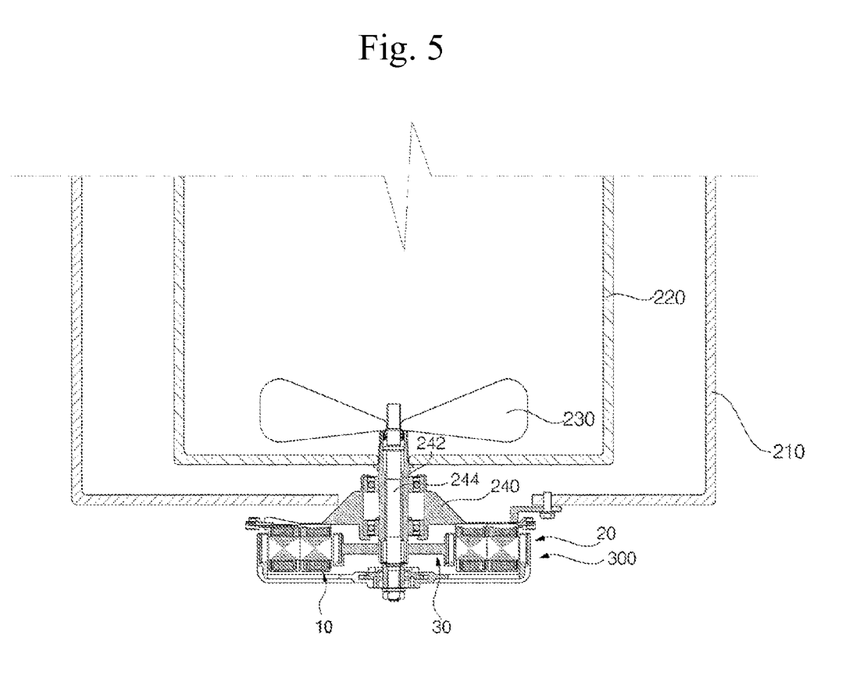
FIG. 5 is a cross-sectional view of a washing machine in which a motor drive device according to the present invention is applied.
Figure 6:
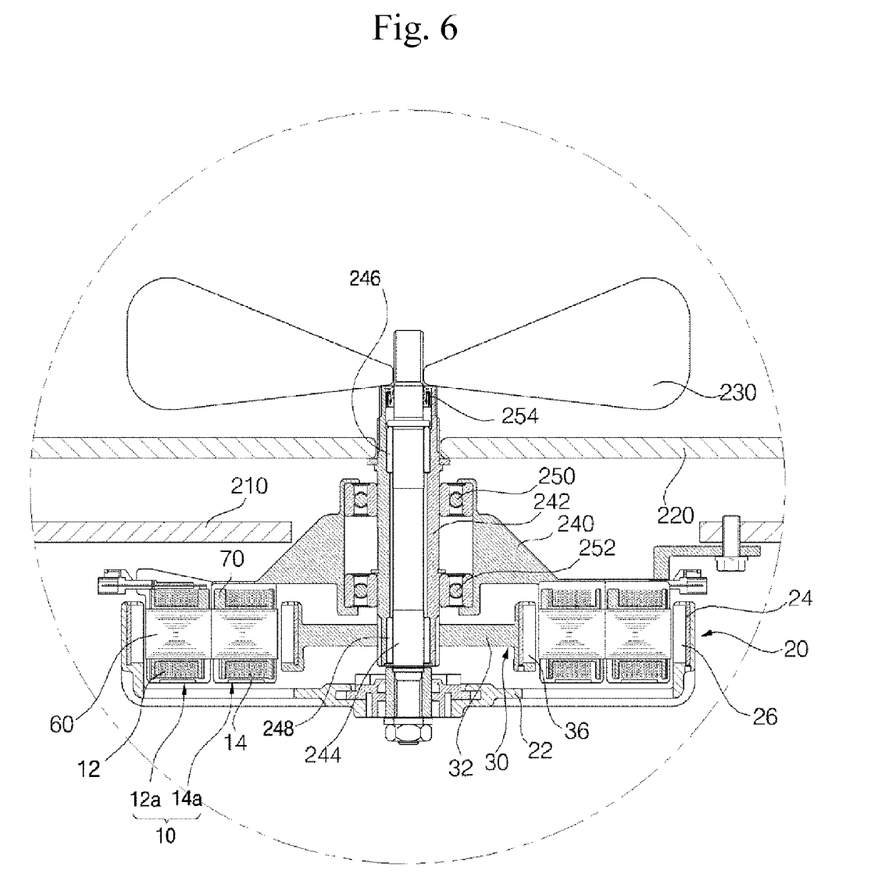
FIG. 6 is a cross-sectional view of a motor for a washing machine in which a motor drive device according to the present invention is applied.
Figure 7:
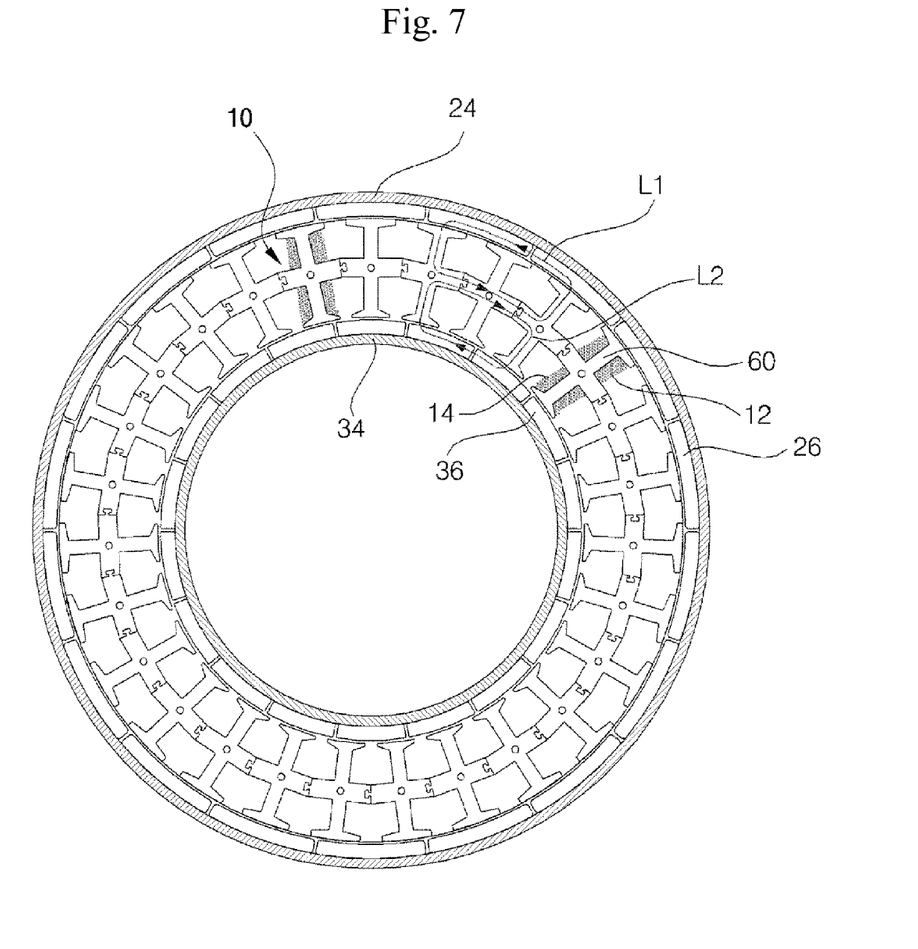
FIG. 7 is a plan view of a motor in which a motor drive device according to the present invention is applied.
Figure 8:
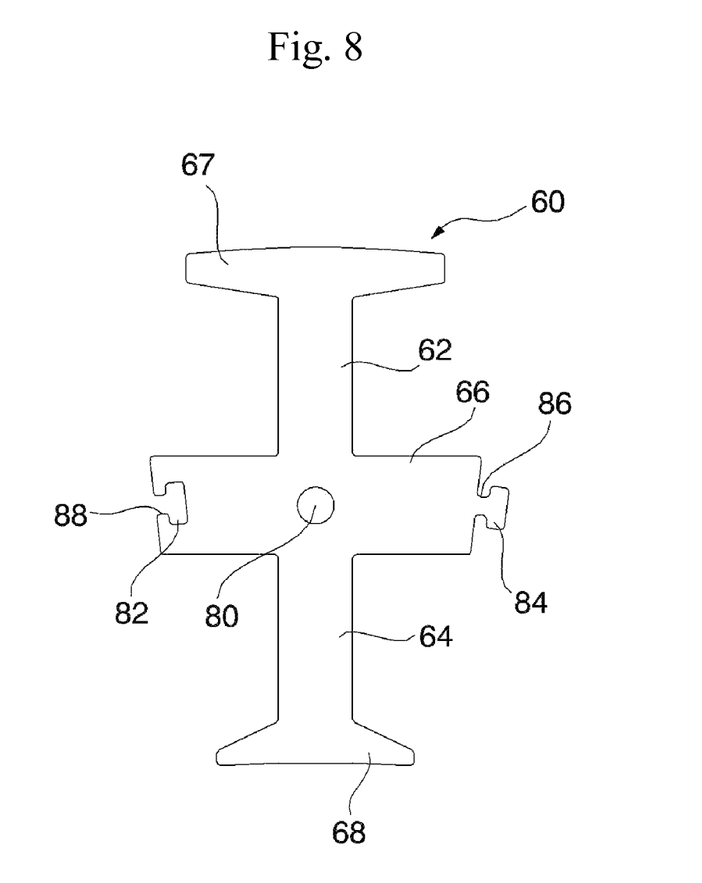
FIG. 8 is a plan view showing a split core for a stator of the motor shown in FIG. 7.
Figure 9:
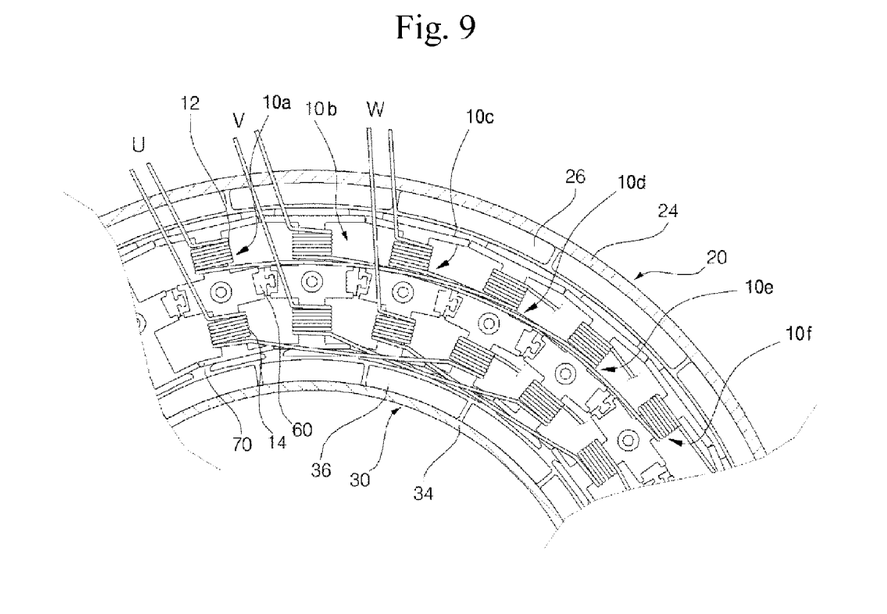
FIG. 9 is a side view illustrating a process of winding respective coils on split cores in the motor, in which a motor drive device according to the present invention is applied.

FIG. 5 is a cross-sectional view of a washing machine in which a motor drive device according to the present invention is applied. FIG. 6 is a cross-sectional view of a motor for a washing machine in which a motor drive device according to the present invention is applied. FIG. 7 is a plan view of a motor in which a motor drive device according to the present invention is applied. FIG. 8 is a plan view showing a split core for a stator of the motor shown in FIG. 7. FIG. 9 is a side view illustrating a process of winding respective coils on split cores in the motor, in which a motor drive device according to the present invention is applied.

Relating to FIGS. 5 to 7, a washing machine in which a motor dive device of the present invention is applied, includes: a case forming an outer appearance; a washing tub 210 that is suspended in the inside of the case and accommodates laundry water; a dehydrator 220 that is rotatably disposed in the inside of the washing tub 210, to thus perform a laundry operation and a dehydration operation; a pulsator 230 that is rotatably disposed in the inside of the dehydrator 220, to thus form a laundry water stream; and a motor 300 that is provided in the lower portion of the washing tub 210, to thus drive the dehydrator 220 and the pulsator 230 simultaneously or selectively.

A support member 240 is fixed below the washing tub 210, and a dehydrator rotating shaft 242 that is connected to the dehydrator 220 to rotate the dehydrator 220 is rotatably supported to the support member 240. In addition, a pulsator rotating shaft 244 that is connected to the pulsator 230 to rotate the pulsator 230 is rotatably disposed in the inside of the dehydrator rotating shaft 242.

The motor 300 includes: a double-stator 10 that is fixed below the washing tub 210; an outer rotor 20 that is positioned with a certain gap on the outer circumferential surface of the double-stator 10 and is connected to the pulsator rotating shaft 244; and an inner rotor 30 that is positioned with a certain gap on the inner circumferential surface of the double-stator 10 and is connected to the dehydrator rotating shaft 242.

The dehydrator rotating shaft 242 is formed in a hollow form. The upper portion of the dehydrator rotating shaft 242 is fixed to the dehydrator 220. The central portion of the dehydrator rotating shaft 242 is rotatably supported to the support member 240 through bearings 250 and 252 placed between the dehydrator rotating shaft 242 and the support member 240. The lower portion of the dehydrator rotating shaft 242 is spline-combined with the inner rotor 30, so that the dehydrator rotating shaft 242 is rotated together with rotation of the inner rotor 30.

The pulsator rotating shaft 244 is rotatably supported to the inner portion of the dehydrator rotating shaft 242. The upper portion of the pulsator rotating shaft 244 is fixed to the pulsator 230. The lower portion of the pulsator 230 is spline-combined with the outer rotor 20, so that the pulsator rotating shaft 244 is muted together with rotation of the outer rotor 20.

A pair of sleeve hearings 246 and 248 are inserted into the upper and lower sides between the dehydrator rotating shaft 242 and the pulsator rotating shaft 244, to thus rotatably support the pulsator totaling shaft 244, and a sealing member 254 is provided at the leading end portion between the dehydrator rotating shaft 242 and the pulsator rotating shaft 244 that are located at the inside of the dehydrator 220, to thus prevent laundry water filled in the dehydrator 220 from leaking.

The outer rotor 20 includes: a first rotor support 22; a first annular back yoke 24 that is fixed to one side of the first rotor support 22; and a number of first magnets 26 that are fixed on the inner circumferential surface of the first back yoke 24 and are disposed with a certain gap opposite the outer circumferential surface of the double-stator 10.

The outer rotor 20 is configured by aligning the first back yoke 24 and the first magnets 26 in a mold in an annular form and then integrally molding the first rotor support 22 by an insert-molding method.

The back yoke 24 and the first magnets 26 are fixed to one side of the first rotor support 22 and the other side of the first rotor support 22 is spline-combined with the pulsator rotating shaft 244.

The inner rotor 30 includes: a second rotor support 32: a second annular back yoke 34 that is fixed to the outer circumferential surface of the second rotor support 32; and a number of second magnets 36 that are fixed to the outer circumferential surface of the second back yoke 34 and are disposed with a certain gap opposite the inner circumferential surface of the double-stator 10.

The inner rotor 30 is configured by aligning the second back yoke 34 and the second magnets 36 in a mold in an annular form and then integrally molding the second rotor support 32 by an insert-molding method.

The second rotor support 32 is formed in the form of a disc whose central portion is open. The second back yoke 34 and the second magnets 36 are fixed on the outer surface of the second rotor support 32. The inner surface of the second rotor support 32 is spline-combined with the dehydrator rotating shall 242.

As described above, the pulsator rotating shaft 244 is connected with the outer rotor 20, and thus is rotated together with rotation of the outer rotor 20, and the dehydrator rotating shaft 242 is connected with the inner rotor 30, and thus is rotated together with rotation of the inner rotor 30. As a result, the pulsator rotating shaft 244 and the dehydrator rotating shall 242 are rotated separately or simultaneously.

The double-stator 10 includes a number of split core assemblies 10a-10f around which a first coil 12 and a second coil 14 are wound.

Each of the split core assemblies 10a-10f includes: a split core 60; an insulating bobbin 70 surrounding the outer circumferential surface of the split core 60; the first coil 12 that is wound on one side of the split core 60 and through which a first drive signal is applied: and the second coil 14 that is wound on the other side of the split core 60 and through which a second drive signal is applied in which the second drive signed is equal to or different from the first drive signal.

Here, since the first driving signal is applied to the first coil 12 and the second driving signal is applied to the second coil 14, the rotating torque of the pulsator 230 and the dehydrator 220 may be designed to suit for the respective rotating forces thereof, to thus improve the efficiency of the motor.

As shown in FIG. 8, the split core 60 includes: an outer T-shaped tooth 62 around which the first coil 12 is wound; an inner T-shaped tooth 64 that is formed on the opposite side of the outer T-shaped tooth 62 and around which the second coil 14 is wound; a partition 66 that divides between the outer T-shape tooth 62 and the inner T-shaped tooth 64; and connectors 82 and 84 that are formed in a concave groove and a convex protrusion, at both ends of the partition 66, respectively, to thereby connect between the adjacent split cores 60 with each other.

A first extension portion 67 which is positioned facing the outer rotor 20 is formed at the end of the outer T-shaped tooth 62, and a second extension portion 68 which is positioned facing the inner rotor 30 is formed at the end of the inner T-shaped tooth 64.

In addition, a throughhole 80 is formed at the center of the split core 60, in order to tighten a plurality of laminated split cores with a bolt between an upper fixed plate and a lower fixed plate.

The first extension portion 67 and the second extension portion 68 are formed into an introverted surface and an extroverted surface of a predetermined curvature, respectively, so as to correspond to a first magnet 26 of the outer rotor 20 and a second magnet 36 of the inner rotor 30, respectively. Thus, the roundness of the inner and outer circumferences of the split core 60 increases, to thus make the inner and outer circumferences of the stator 10 approach to the first magnet 26 and the second magnet 36, respectively, but to maintain even a constant magnetic gap.

The split cores 60 should he directly connected with each other so as to form a magnetic circuit between the split cores 60. Thus, the connectors 82 and 84 are formed in a concave groove and a convex protrusion, respectively, in a structure of directly connecting between the split cores 60.

For example, the connectors 82 and 84 are formed into a coupling groove structure and a coupling protrusion structure, in which the connector 82 of the coupling groove structure is formed at one side of the partition 66 and the connector 84 of the coupling protrusion structure is formed at the other side of the partition 66, and thus the connector 84 is fitted into the connector 82. A narrow neck portion 86 is formed in the connector 84 of the coupling protrusion structure, and a narrow entrance portion 88 is formed in the connector 82 of the coupling groove structure, so that the neck portion 86 of the connector 84 is caught by the entrance portion 88 of the connector 82.

Hereinbelow, a process of winding coils around the double-stator 10 will he described. First, a plurality of split cores 60 are stacked and then bobbins 70 are respectively surrounded on the outer circumferential surfaces of the split cores by an insert molding method.

Then, a coil winding process is performed in which the first coil 12 is wound on the outer T-shaped tooth 62 of each split core 60 and the second coil 14 is wound on the inner T-shaped tooth 64 of each split core 60. As a result, the double-stator of the present invention is configured to have an outer stator 12a in which the first coil 12 is wound on the outer T-shaped tooth 62, and an inner stator 14a in which the second coil 14 is wound on the inner T-shaped tooth 64.

In addition, the outer stator 12a may be formed by winding the first coil 12 wound on the outer T-shaped tooth 62 in the clockwise (CW) direction, and the inner stator 14a may be formed by winding the second coil 14 wound on the inner T-shaped tooth 64 in the counterclockwise (CCW) direction.

As described above, since the winding directions of the first coil 12 and the second coil 14 are opposite to each other, it is possible to rotate the dehydrator 220 in the direction opposite to that of the pulsator 230, in a laundry or rinse mode in a washing machine.

In addition, in this case, it is necessary to individually provide hall devices needed to respectively detect the rotational positions of the outer rotor 20 and the inner rotor 30, in order to individually drive the first coil 12 for the outer stator 12a and the second coil 14 for the inner suitor 14a.

In the case of the above-described motor, a first magnetic circuit L1 is formed between the outer rotor 20 and one side of the double-stator 10 on which the first coil 12 is wound, that is, the outer stator, and a second magnetic circuit L2 is formed between the inner rotor 30 and the other side of the double-stator 10 on which the second coil 14 is wound, that is, the inner stator, to thus form a pair of independent magnetic circuits. As a result, a magnetic path gets shorter and thus a magnetoresistance is reduced, to thereby reduce the loss of a magnetic force and improve the efficiency of the motor.

Specifically, the first magnetic circuit L1 is formed so that a magnetic flux of the first magnetic circuit L1 passes an N-pole first magnet 26, an outer T-shaped tooth 62 that faces the N-pole first magnet 26 and on which a first coil 12 is wound, an outer portion of a partition 66, an S-pole first magnet 26 adjacent to the N-pole first magnet 26, and a first back yoke 24.

In addition, the second magnetic circuit L2 is formed so that a magnetic flux of the second magnetic circuit L2 passes an N-pole second magnet 36, an inner T-shaped tooth 64 that faces the N-pole second magnet 36 and on which a second coil 14 is wound, an inner portion of a partition 66, an S-pole second magnet 36 adjacent to the N-pole second magnet 36, and a second back yoke 34.

A motor drive device for a washing machine using a motor of a double-rotor/double-stator structure will be described below.

Figure 1:
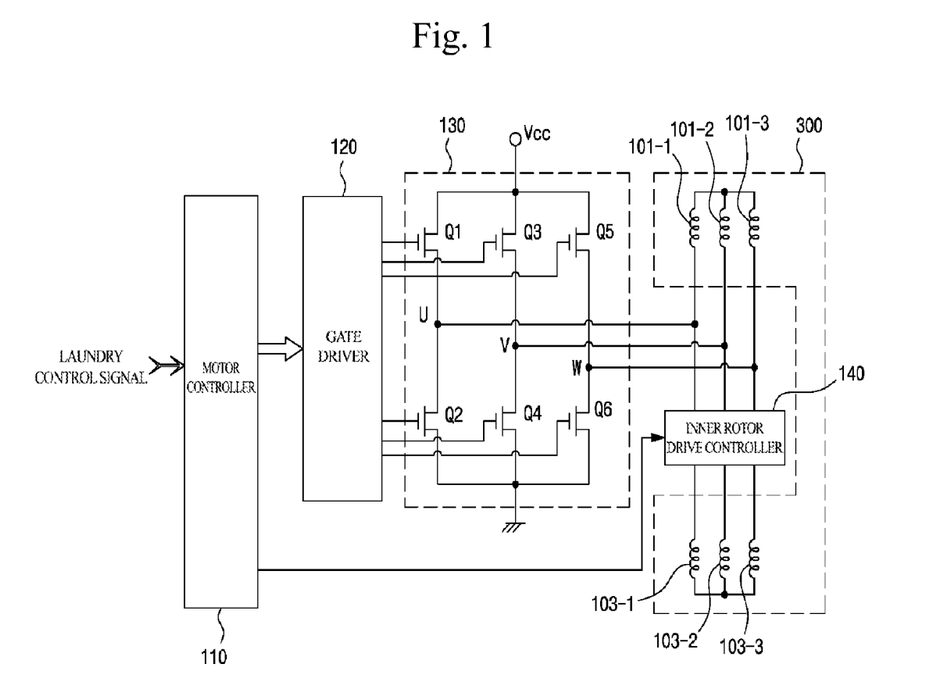
FIG. 1 is a circuit diagram showing a motor drive device for a washing machine according to a first embodiment of the present invention.

FIG. 1 is a circuit diagram showing a motor drive device for a washing machine according to a first embodiment of the present invention.

Referring to FIG. 1 in addition to FIGS. 5 to 9, a motor 300 for a washing machine having a double-stator includes a number of split cores 60 in which each stator core 60 includes an outer T-shaped tooth 62 and an inner T-shaped tooth 64. The first coil 12 of three phases (U-phase, V-phase and W-phase) is sequentially wound on the outer T-shaped tooth 62, and the second coil 14 of three phases (U-phase, V-phase and W-phase) is sequentially wound on the inner T-shaped tooth 64.

The three-phase first coil 12 includes first three-phase stator coils 101-1, 101-2, and 101-3, and the second three-phase coil 14 includes second three-phase stator coils 103-1, 103-2, and 103-3.

When three-phase AC power is applied to the first three-phase stator coils 101-1, 101-2, and 101-3, the outer rotor 20 is driven to rotate. When three-phase AC power is applied to the second three-phase stator coils 103-1, 103-2, and 103-3, the inner rotor 30 is driven to rotate.

Here, the pulsator rotating shaft 244 is connected to the outer rotor 20, and the dehydrator rotating shaft 242 is connected to the inner rotor 30.

Accordingly, on one hand, when three-phase AC power is applied to the first three-phase stator coils 101-1, 101-2, and 101-3, the outer rotor 20 is driven to rotate and simultaneously the pulsator 230 is rotated. On the other hand, when three-phase AC power is applied to the second three-phase stator coils 103-1, 103-2, and 103-3, the inner rotor 30 is driven to rotate, and simultaneously the dehydrator 220 is rotated.

A reference numeral 110 denotes a motor controller. The motor controller 110 generates a drive signal for driving the motor 300 for the washing machine according to a control signal such as washing, rinsing, and dehydration that is input from an external controller (not shown) of the washing machine.

For example, the motor controller 110 generates a PWM (Pulse Width Modulation) drive signal for driving the motor 300 for the washing machine.

A reference numeral 120 denotes a gate driver. The gate driver 120 amplifies a voltage level of the drive signal generated from the motor controller 110 to a sufficient level.

A reference numeral 130 denotes an inverter. The inverter 130 includes three pairs of switching devices (Q1, Q2), (Q3, Q4) and (Q5, Q6) that perform switching operations of DC power of an electric power source Vcc, depending on the drive signal that is amplified to have a sufficient voltage level by the gate driver 130. The three pairs of switching devices (Q1, Q2), (Q3, Q4) and (Q5, Q6) are divided into upper switching devices Q1, Q3, and Q5 and lower switching devices Q2, Q4, and Q6 and connected in a totem pole structure.

In addition, the three-phase (U-phase, V-phase and W-phase) AC power occurs at the junction of each of the three pairs of the switching devices (Q1, Q2) (Q3, Q4) and (Q5, Q6), and the three-phase AC power is output to the first three-phase stator coils 101-1, 101-2, and 101-3 and the second three-phase stator coils 103-1, 103-2, and 103-3.

A reference numeral 140 denotes an inner rotor drive controller. The inner rotor drive controller 140 is provided between the inverter 130 and the second three-phase stator coils 103-1, 103-2, and 103-3 of the motor 300 for the washing machine.

In addition, the inner rotor drive, controller 140 controls the three-phase AC power generated from the inverter 130 to be applied to or blocked for the second three-phase stator coils 103-1, 103-2, and 103-3, under the control of the motor controller 110, to thereby control the inner rotor 30 to rotate or stop.

When the washing machine is in a wash or rinse mode, the three-phase AC power is applied to the first three-phase stator coils 101-1, 101-2, and 101-3 so as to rotate the outer rotor 20 connected the pulsator rotating, shaft 244. Accordingly, it is desirable that the dehydrator 220 is in a stop state or is rotated in a direction opposite to that of the pulsator 230.

In this case, when the dehydrator 220 is rotated in the same direction as that of the pulsator 230 due to the strength of the water stream at the time of the rotation of the pulsator 230, a phenomenon of weakening a laundry function may occur.

Therefore, it is desirable that the dehydrator 220 is rotated in a direction opposite to that of the pulsator 230 in order to prevent this phenomenon of weakening a laundry function from happening and simultaneously enhance the laundry function. For this purpose, the first coil 12 of the outer stator 12a and the second coil 14 of the inner stator 14a are wound in the opposite direction to each other when the double-stator is formed in the present invention. Accordingly, the three-phase AC power is applied to both the first three-phase stator coils 101-1, 101-2, and 101-3 and the second three-phase stator coils 103-1, 103-2, and 103-3, it is possible to rotate the dehydrator 220 in a direction opposite to that of the pulsator 230.

In addition, when the washing machine is in a dehydration mode, it is desirable that the three-phase AC power is applied to the second three-phase stator coils 103-1, 103-2, and 103-3 so as to rotate the inner rotor 30 connected to the dehydrator rotating shaft 242, or the three-phase AC power is applied to the first three-phase stator coils 101-1, 101-2, and 101-3 and the second three-phase suitor coils 103-1, 103-2, and 103-3, simultaneously, so as to rotate the dehydrator 220 and the pulsator 230 in the same direction each other.

In the case that the motor drive device for the washing machine having the above-described configuration of the present invention washes laundry, the motor controller 110 generates a PWM drive signal in accordance with a laundry control signal that is entered from the outside. The generated PWM drive signal is amplified via the gate driver 120 and then the amplified PWM drive signal is applied to the gates of the switching devices Q1 to Q6 of the inverter 130.

Here, the inverter 130 is configured so that the PWM drive signal is applied to one gate of the upper switching devices Q1, Q3, and Q5 and one gate of the lower switching devices Q2, Q4, and Q6, according to detection of the rotor position of the hall devices. In this case, the inverter 130 may be driven in a manner that when a U-phase upper switching device Q1 among the upper switching devices Q1, Q3, and Q5 is turned on depending on detection of the rotor position of the hall device, for example, at 0°, a W-phase lower switching device Q6 is turned on. That is, the inverter 130 may be driven in a 6-step mode.

In addition, the PWM drive signals that are applied to the gates of the upper switching devices Q1, Q3, and Q5, have a phase difference of 120° or 180° from one another.

Therefore, the switching devices Q1 to Q6 of the inverter 130 are alternately turned on and turned off according to the PWM drive signal that has been amplified in the gate driver 120, to thus perform a switching operation of the DC power of the electric power source Vcc and generate three-phase AC power to then output to the motor 300 for the washing machine Since the three-phase AC power output from the inverter 130 is directly applied to the first three-phase stator coils 101-1, 101-2, and 101-3 in the motor 300 for the washing machine, the outer rotor 20 constituting the first magnetic circuit L1 is rotated to thus rotate the pulsator 230 in the case that the first three-phase stator coils 101-1, 101-2, and 101-3 are excited.

In this case, the three-phase AC power is applied to or blocked for the second three-phase stator coils 103-1, 103-2, and 103-3 under the control of the motor controller 110. In other words, when the motor controller 110 controls the inner rotor drive controller 140 to block the three-phase AC power, the three-phase AC power is not applied to the second three-phase stator coils 103-1, 103-2, and 103-3. Accordingly, the inner rotor 30 is not rotated, and thus the dehydrator rotating shaft 242 connected to the inner rotor 30 and the dehydrator 220 connected to the dehydrator rotating shaft 242 are not rotated.

In addition, when the motor controller 110 controls the inner rotor drive controller 140 to pass three-phase AC power, the three-phase AC power is applied to the second three-phase stator coils 103-1, 103-2, and 103-3. Accordingly, the inner rotor 30 is rotated, and thus the dehydrator rotating shaft 242 connected to the inner rotor 30 and the dehydrator 220 connected to the dehydrator rotating shaft 242 are rotated.

Figure 10:
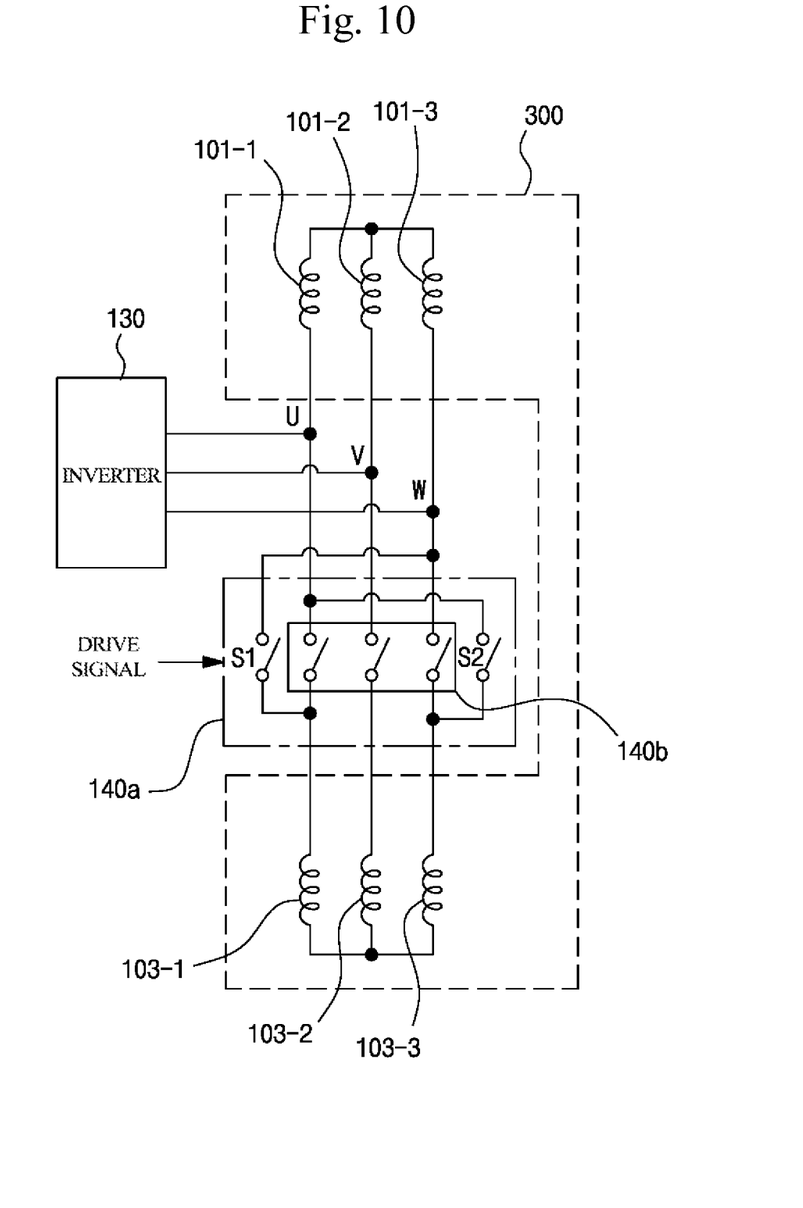
FIG. 10 is a circuit diagram showing an inner rotor drive controller in the motor drive device for the washing machine shown in FIG. 1 according to the first embodiment of the present invention.

Here, the motor controller 110 controls the inner rotor drive controller 140 to thus change the terminal to which the three-phase AC power is output, and to thereby change the direction of rotation of the inner rotor 30. To this end, as shown in FIG. 10, the inner rotor drive controller 140 may include three main switches 140b that apply or block U-phase. V-phase and W-phase AC power to the second three-phase stator coils 103-1, 103-2, and 103-3, respectively, and may additionally include two auxiliary switches S1 and S2 to change U-phase and W-phase AC power so that U-phase AC power is applied through the W-phase and W-phase AC power is applied through the U-phase. In this case, switches, relays or switching circuits may be used as the main and auxiliary switches 140b, S1, and S2, respectively.

In this case, when the main switches 140b are connected so that the U-phase, V-phase and W-phase AC power output from the inverter 130 are applied to the second three-phase stator coils 103-1, 103-2, and 103-3, respectively, the inner rotor 30 is rotated in the forward direction.

In the case that the inner rotor 30 is rotated in the reverse direction, the auxiliary switches S1 and S2 are connected instead of the main switches 140b, to thus change the path through which the AC output is applied. Under the circumstances, when the U-phase, V-phase and W-phase AC power is applied to the second three-phase stator coils 103-1, 103-2, and 103-3, respectively, the path through which the AC output is applied is changed and thus the inner rotor 30 is rotated in the reverse direction.

As described above, the motor controller 110 controls the inner rotor drive controller 140 so that the inner rotor 30 does not rotate, the inner rotor 30 rotates in the same direction as that of the outer rotor 20, or the inner rotor 30 rotates in the opposite direction to that of the outer rotor 20.

In other words, the motor controller 110 controls that the dehydrator 220 connected to the dehydrator rotating shaft 242 connected to the inner rotor 30 does not rotate, the dehydrator 220 rotates in the same direction as that of the pulsator 230, or the dehydrator 220 rotates in the opposite direction to that of the pulsator 230.

Therefore, when the washing and rinsing operations are performed while rotating the pulsator 230 in the present invention, the inner rotor 30 is controlled to stop so that the dehydrator 220 does not rotate, or the dehydrator 220 is controlled to rotate in the same direction as and in the reverse rotation to that of the pulsator 230, to thereby improve the laundry efficiency. In the case that the inner rotor 30 is controlled to stop so that the dehydrator 220 does not rotate, it is also possible to configure the second three-phase stator coils 103-1, 103-2, and 103-3 to be short-circuited under the control of the inner rotor drive controller 140.

In addition, in the case that the dehydration operation is performed in the present invention, the inner rotor drive controller 140 is controlled to rotate the dehydrator 220 in the same direction as that of the pulsator 230, to thus improve the dehydration efficiency of laundry.

In this case, the inner rotor drive controller 140 may he implemented by using switches, relays or switching circuits, respectively, in a manner that the U-phase, V-phase and W-phase AC power may be applied to or blocked for the second three-phase stator coils 103-1, 103-2, and 103-3, respectively.

Figure 11:
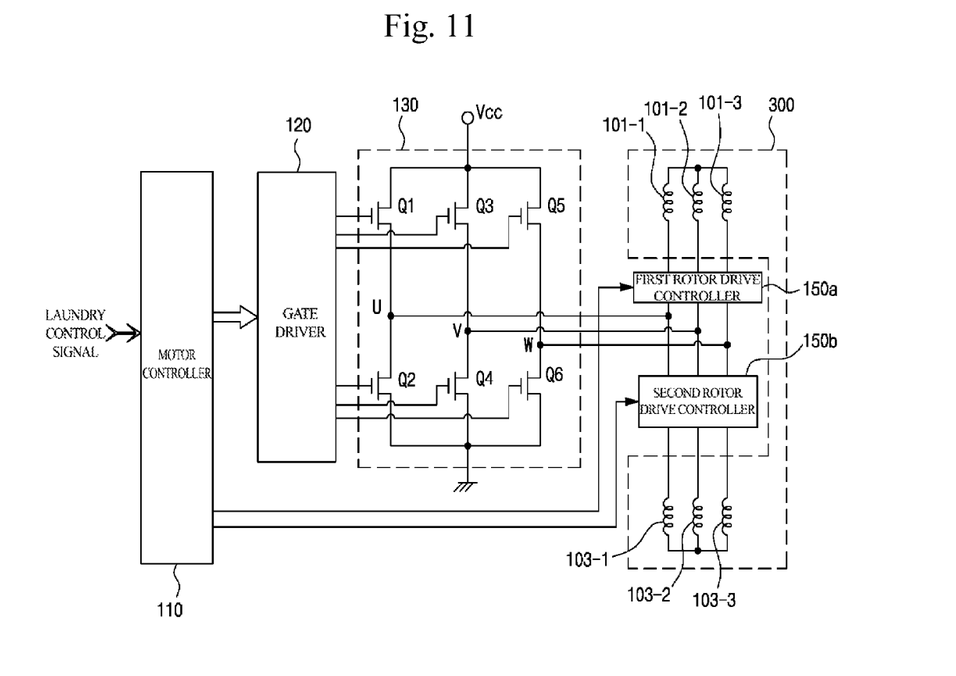
FIG. 11 is a circuit diagram showing a motor drive device for a washing machine according to a second embodiment of the present invention.

Meanwhile, a motor drive device for a washing machine according to a second embodiment of the present invention as shown in FIG. 11, may be provided in order to selectively drive the inner rotor 30 and outer rotor 20 or drive the inner rotor 30 and outer rotor 20 to rotate in the opposite direction to each other.

FIG. 11 is a circuit diagram showing a motor drive device for a washing machine according to a second embodiment of the present invention.

Referring to FIG. 11, the motor drive device for the washing machine according to the second embodiment of the present invention differs front the first embodiment of the present invention shown in FIG. 1, in a viewpoint that first and second rotor drive controllers 150a and 150b are respectively provided between the first three-phase stator coils 101-1, 101-2, and 101-3 and the second three-phase stator coils 103-1, 103-2, and 103-3, with respect to the three-phase AC output of the inverter 130. The remaining portions of FIGS. 1 and 11 are same, and are given by the same reference numerals.

The first and second rotor drive controllers 150a and 150b play a role of controlling the three-phase AC power of the inverter 130 to be applied to or blocked for the first three-phase stator coils 101-1, 101-2, and 101-3 and the second three-phase stator coils 103-1, 103-2, and 103-3, respectively, according to the control signal of the motor controller 110.

In the case that the motor drive device for the washing machine according to the second embodiment of the present invention is employed, the first coil 12 of the outer stator 12a and the second coil 14 of the inner stator 14a are wound in the opposite direction to each other when the double-stator 10 is formed in the present invention. Accordingly, the three-phase AC power is applied to both the first three-phase stator coils 101-1, 101-2, and 101-3 and the second three-phase stator coils 103-1, 103-2, and 103-3, by controlling the first and second rotor drive controllers 150a and 150b, it is possible to rotate the dehydrator 220 in a direction opposite to that of the pulsator 230.

Therefore, the dehydrator 220 may be rotated in a direction opposite to that of the pulsator 230 in the wash and rinse modes. Otherwise, the wash and rinse modes may be executed with only the pulsator 230 by controlling the first rotor drive controller 150a.

In addition, when the washing machine is in the dehydration mode, the second rotor drive controller 150b is controlled to rotate the inner rotor 30 connected to the dehydrator rotating shaft 242, thereby driving only the dehydrator 220.

Figure 2:
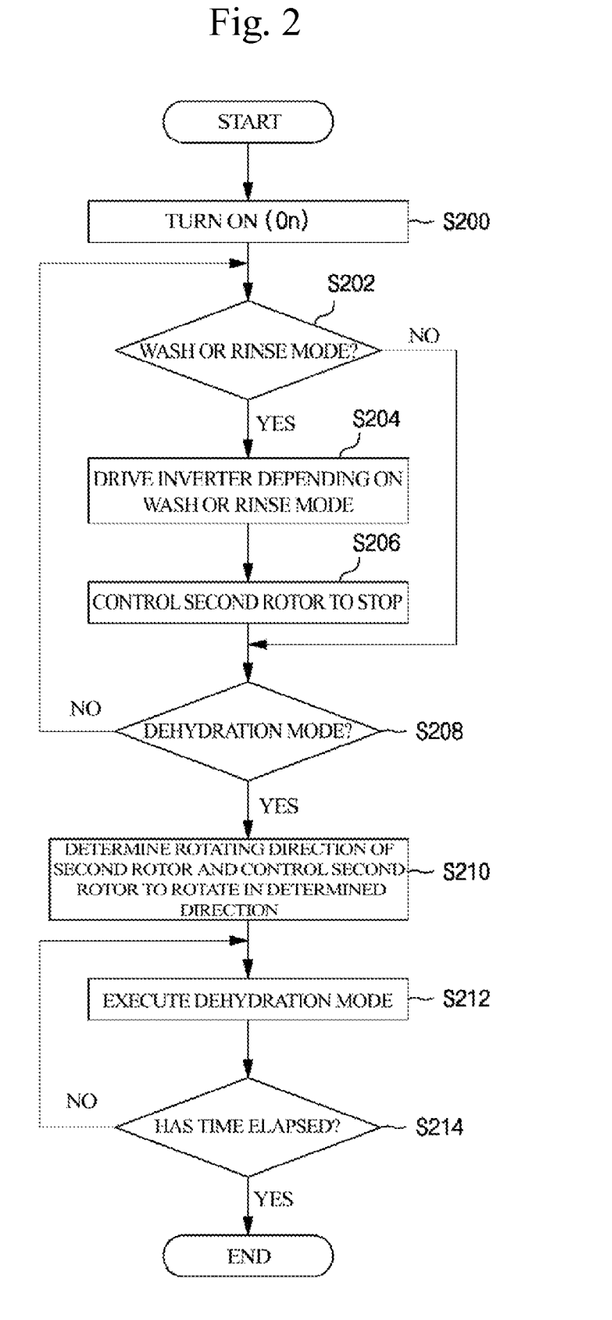
FIG. 2 is a flowchart view for explaining a motor control method for a washing machine in accordance with an embodiment of the present invention.

FIG. 2 is a flowchart view for explaining a motor control method for a washing machine in accordance with an embodiment of the present invention, that is, for illustrating operation of a motor controller. Referring to FIG. 2, electric power is turned on in a washing machine, in step S200.

When the electric power is turned on in the washing machine, the motor controller 110 judges whether the wash or rinse mode is currently executed through a laundry control signal input from an external source (S202).

In the case that it has been judged in the judgment result that the wash or rinse mode is executed, the motor controller 110 drives the inverter 130 depending on the wash or rinse, mode (S204).

Then, the inverter 130 generates the three-phase AC power. The three-phase AC power generated from the inverter 130 is applied to the first three-phase stator coils 101-1 101-2, and 101-3 of the motor 300 for the washing machine, to thus rotate the outer rotor 20 and the pulsator 230, and to thereby execute the washing or rinsing operation.

Here, the motor controller 110 selectively turns on one of the three upper switching; devices Q1, Q3, and Q5 and one of the three lower switching devices Q2, Q4, and Q6 among the three pairs of switching devices (Q1, Q2), (Q3, Q4) and (Q5, Q6) that are provided in the inverter 130 on the basis of the general 6-step mode, to thus generate the three-phase AC power, and changes the three-phase AC power of U-phase, V-phase and W-phase to simultaneously change the phase of the three-phase AC power to be applied to the first three-phase stator coils 101-1, 101-2, and 101-3. Accordingly, the pulsator 230 is changeably rotated in the forward or reverse direction, to thus execute perform the washing or rinsing operation.

In addition, the motor controller 110 controls the inner rotor drive controller 140 so as not to output the three-phase AC power to the second three-phase stator coils 103-1, 103-2, and 103-3, to thus control the inner rotor 30 to stop and control the dehydrator 220 not to rotate (S206).

In addition, the motor controller 110 judges in S208 whether the dehydration mode is currently performed after the inner rotor 30 is stopped, or judges whether the dehydration mode is to be performed in the case that it has not been judges as the wash or rinse mode in step S202.

In the case that the dehydration mode should be performed in the judgment result, the motor controller 110 determines the direction of rotation of the inner rotor 30 and controls the inner rotor drive controller 140 depending on the determined direction of rotation, to thus control the outer rotor 20 and the inner rotor 30 to rotate in the same direction (S210).

Then, the motor controller 110 controls the inverter 130 to generate the three-phase AC power in which the generated three-phase AC power is applied to the first three-phase stator coils 101-1, 101-2, and 101-3 of the motor 300 for the washing machine, as well as the second three-phase stator coils 103-1, 103-2, and 103-3 through the inner rotor drive controller 140, to thus rotate the outer rotor 20 and the inner rotor 30 in the same direction and to rotate the pulsator 230 and the dehydrator 220 in the same direction, thereby executing the dehydration mode of operation (S212).

In addition, the motor controller 110 judges whether or not an execution time of the dehydration mode has elapsed by using a laundry control signal (S214), in which a laundry operation is terminated in the case that the execution time of the dehydration mode has elapsed.

Figure 3:
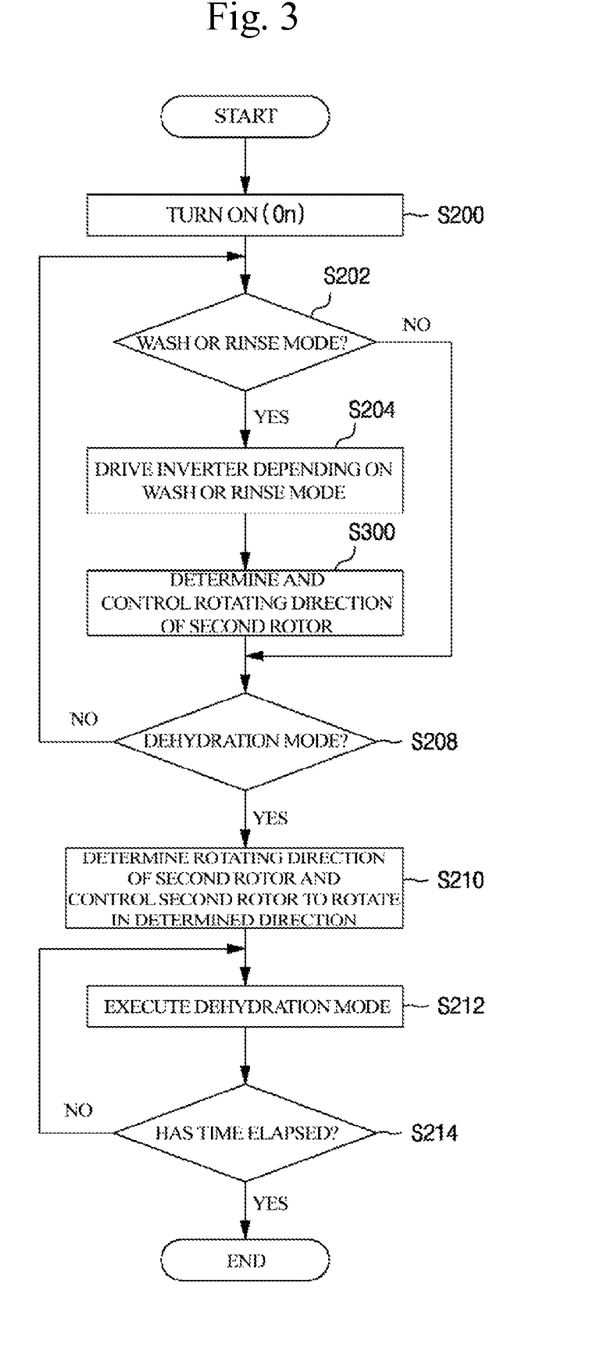
FIG. 3 is a flowchart view for explaining a motor control method for a washing machine in accordance with another embodiment of the present invention.

FIG. 3 is a flowchart view for explaining a motor control method for a washing machine in accordance with another embodiment of the present invention, that is, for illustrating operation of a motor controller. Referring to FIG. 3, the motor control method for the washing machine in accordance with another embodiment of the present invention includes step S300 instead of step S206 in addition to step S204 of FIG. 2, in which the motor controller 110 drives the inverter 130 depending on the wash or rinse mode in step S204, to thus rotate the outer rotor 20 and the pulsator 230 and to then determine the direction of rotation of the inner rotor 30 and control the inner rotor drive controller 140 according to the determined direction of rotation of the inner rotor 30 to rotate the inner rotor 30 to thus control the dehydrator 220 to rotate (S300).

In the above-described other embodiment of the present invention, the dehydrator 220 is rotated in the opposite direction to that of the pulsator 230 on the basis of the rotational direction of the pulsator 230, at a state where the wash or rinse mode is executed by rotating the pulsator 230, to thus more activate movement of laundry in the wash or rinse mode and to thereby improve the laundry efficiency.

Furthermore, in the above-described other embodiment of the present invention, it is possible to rotate the dehydrator 220 in the same direction as that of the pulsator 230 on the basis of the rotational direction of the pulsator 230 as needed.

Figure 4:
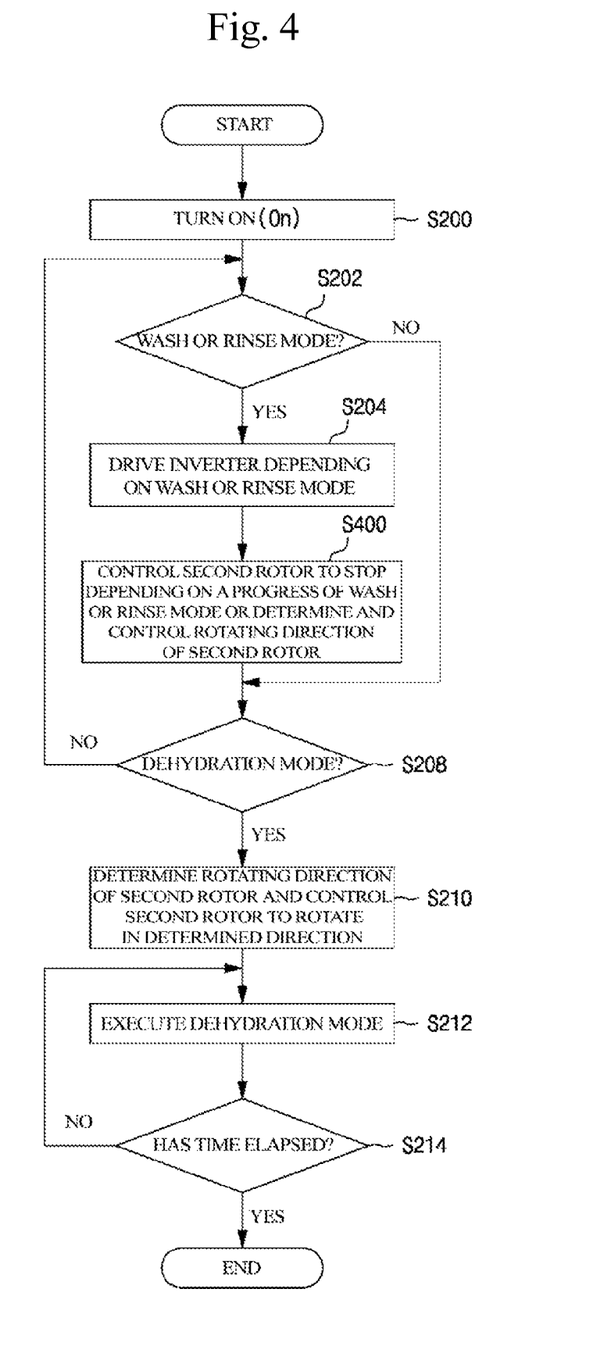
FIG. 4 is a flowchart view for explaining a motor control method for a washing machine in accordance with still another embodiment of the present invention.

FIG. 4 is a flowchart view for explaining a motor control method for a washing machine in accordance with still another embodiment of the present invention, that is, for illustrating operation of a motor controller. Referring to FIG. 4, the motor control method for the washing machine in accordance with still another embodiment of the present invention includes step S400 instead of step S206 in addition to step S204 of FIG. 2, in which the motor controller 110 drives the inverter 130 depending on the wash or rinse mode in step S204, to thus rotate the outer rotor 20 and the pulsator 230 and to then control the inner rotor 30 to stop depending on a progress of the washing or rinsing operation, or determine the direction of rotation of the inner rotor 30 and control the inner rotor drive controller 140 according to the determined direction of rotation of the inner rotor 30 to rotate the inner rotor 30 to thus control the dehydrator 220 to rotate (S400).

In the above-described other embodiment of the present invention, the dehydrator 220 is rotated in the same direction as or in the opposite direction to that of the pulsator 230 on the basis of the rotational direction of the pulsator 230, depending on a progress of the washing or rinsing operation, at to state where the wash or rinse mode is executed by rotating the pulsator 230, to thus more activate movement of laundry in the wash or rinse mode and to thereby improve the laundry efficiency.

INDUSTRIAL APPLICABILITY

The present invention is applied to a motor drive device for driving a motor for a washing machine having a double-rotor/double-stator structure that can selectively a pulsator and a dehydrator without having a separate clutch.

As described above, the present invention has been described with respect to particularly preferred embodiments. However, the present invention is not limited to the above embodiments, and it is possible for one who has an ordinary skill in the art to make various modifications and variations, without departing from the spirit of the present invention. Thus, the protective scope of the present invention is not defined within the detailed description thereof but is defined by the claims to be described later and the technical spirit of the present invention.

What is claimed is:

1. A motor drive device for a washing machine, the motor drive device comprising:
   a motor controller that generates a drive signal according to a laundry mode signal to control a motor for the washing machine;
   a single inverter that generates three-phase alternating-current (AC) power according to the drive signal from the motor controller, wherein the single inverter is configured to output the three-phase AC power to a first three-phase stator coil for rotating a first rotor in the motor, and a second three-phase stator coil for rotating a second rotor therein, and wherein the first rotor is coupled to a pulsator of the washing machine and the second rotor is coupled to a dehydrator thereof; and
   a first rotor drive controller installed between the single inverter and the second three-phase stator coil, wherein the first rotor controller is configured to block or pass the three-phase AC power being applied to the second three-phase stator coil according to the drive signal from the motor controller to rotate the second rotor in a direction opposite to that of the first rotor or stop rotation of the second rotor.

2. The motor drive device according to claim 1, wherein the first three-phase coil is wound in opposite direction of that of the second three-phase coil.

3. The motor drive device according to claim 1, wherein the first rotor drive controller is further configured to rotate the second rotor in a same direction as that of the first rotor according to the drive signal from the motor controller under a dehydration mode of the washing machine.

4. The motor drive device according to claim 1, wherein the first rotor drive controller is further configured to switch two phases of the three-phase AC power according to the drive signal from the motor controller to change the direction of rotation of the second rotor, and
   wherein the first rotor drive controller is further configured to rotate the second rotor in a same direction as or a reverse direction to that of the first rotor.

5. The motor drive device according to claim 1, further comprising a second rotor drive controller installed between the single inverter and the first three-phase stator coil to block or pass the three-phase AC power being applied to the first three-phase stator according to the drive signal from the motor controller, thereby controlling rotation of the first rotor,
   wherein winding directions of the first and second three-phase stator coils are opposed to each other, and
   wherein the motor controller is configured to control the first and second rotor drive controllers to rotate the second rotor in a reverse direction to that of the first rotor in case of a laundry or rinse mode of the washing machine.

6. The motor drive device according to claim 1, further comprising a gate driver that is provided between the motor controller and the single inverter to amplify the driving signal and output the amplified driving signal to the single inverter.

7. The motor drive device according to claim 1, wherein the single inverter is configured to have a structure that three upper switching elements and three lower switching elements are connected in a totem pole structure, and
   wherein the three-phase AC power of U-phase, V-phase and W-phase is generated at the junction among the three pairs of the switching elements and the generated three-phase AC power is output to the first and second three-phase stator coils.

8. The motor drive device according to claim 1, wherein the drive signal includes a PWM (Pulse Width Modulation) drive signal.

9. The motor drive device according to claim 1, wherein a pulsator rotating shaft connected with the pulsator is connected with the first rotor, and a dehydrator rotating shaft connected with the dehydrator is connected with the second rotor.

10. The motor drive device according to claim 1, wherein the motor for the washing machine comprises:
    a double-stator that is disposed with an air gap between the first rotor and the second rotor, wherein the first three-phase stator coil interacts with the first rotor to form a first magnetic circuit and a second three-phase stator coil interacts with the second rotor to form a second magnetic circuit.

11. The motor drive device according to claim 10, wherein the double-stator comprises:
    a number of split cores that are assembled in an annular form, in which outer T-shaped teeth are formed at an outer side of the annular split cores, and inner T-shaped teeth are formed at an inner side of the annular split cores; and
    a number of insulator bobbins surrounding an outer surfaces of each of the split cores, and
    wherein the first three-phase stator coil is wound on the outer T-shaped teeth, and the second three-phase stator coil is wound on the inner T-shaped teeth.

12. The motor drive device according to claim 10, wherein winding directions of the first and second three-phase coils are opposed to each other.

* * * * *